July 1, 1969 H. MAGNUSKI 3,453,562
DELTA MODULATOR WITH UNIFORM QUANTIZING STEPS
Filed June 14, 1966 Sheet 1 of 2

INVENTOR
HENRY MAGNUSKI
BY
Mueller, Aichele & Rauner
ATTYS.

July 1, 1969 H. MAGNUSKI 3,453,562

DELTA MODULATOR WITH UNIFORM QUANTIZING STEPS

Filed June 14, 1966 Sheet 2 of 2

INVENTOR
HENRY MAGNUSKI
BY
Mueller, Aichele & Rauner
ATTYS.

United States Patent Office 3,453,562

Patented July 1, 1969

3,453,562
DELTA MODULATOR WITH UNIFORM QUANTIZING STEPS

Henry Magnuski, Glenview, Ill., assignor to Motorola, Inc., Franklin Park, Ill., a corporation of Illinois Filed June 14, 1966, Ser. No. 557,411
Int. Cl. H03k 7/02
U.S. Cl. 332—11 8 Claims

ABSTRACT OF THE DISCLOSURE

In a delta modulator circuit the derived digital signal is combined with the modulation signal in the integrating circuit. This develops a digital signal having relatively uniform quantizing steps regardless of the amplitude of the modulation signal.

This invention relates to a delta modulator and in particular to a stable delta modulator with uniform quantizing steps.

In the usual delta modulator the voice input signal is compared with the digitally reproduced modulation signal which is available from the integrator. Both signals are coupled to a comparator in parallel or in series and the difference between the two signals is sampled at regular intervals by clock pulses. A multivibrator circuit is triggered either on or off depending upon the polarity of the difference signal to provide a digital output signal from the delta modulator. This digital signal is also fed back to the integrator.

One problem in the usual delta modulator is that the quantizing steps are not uniform. As the modulation signal increases it causes an equivalent voltage build-up across the integrating capacitor and, since the digital signal provides a constant charging voltage, the charging steps become smaller and the discharging steps become larger. This limits the amplitude of the modulation signal which can be reproduced without distortion and thus decreases the signal to quantizing noise ratio because the signal amplitudes smaller while the quantizing noise remains about the same.

In a stable delta modulator, when no voice signal is applied, a pulse, no pulse or 101010 pattern appears at the output. This means that the integrating capacitor is continuously charged and discharged by one quantizing step and the average voltage across it is zero. Therefore, with a stable delta modulator, quantizing or other noise is not heard between words. Psychologically this is very important, and often delta modulation systems with a high measured quantizing noise but which are quite between words are judged by listeners to be better than systems which have a lower quantizing noise but which are unstable and in which noise or weak tones are heard between words. In order to keep the delta modulator stable the charging and discharging steps have to be identical. This is very difficult, if not impossible, to obtain in practical systems. Even if the delta modulator is adjusted so that it is balanced, the slightest change in voltages from the power supply or a change in resistance due to temperature variation will upset this balance. When the balance is upset a charge accumulates on the integrating capacitor. When the gradually accumulating charge develops a voltage which exceeds the half quantizing level, an extra pulse is omitted (or added). To the listener the periodically added or omitted pulses sound like noise or audio tones. In order to stablilize the modulator a discharge resistor is connected across the integrating capacitor to discharge the voltage at the same rate as it accumulates. If the unbalance between the charging and discharging steps can reach large proportions a resistance having small value must be provided.

When a modulation signal is applied to the modulator, large voltages, equivalent to the modulating signals, are present across the integrating capacitor. The discharge resistor will tend to discharge these voltages rapidly and therefore will limit the amplitude of the quantizing steps. This limits the amplitude of the reproduced signals and leads to distortion and poor signal-to-noise ratio.

It is, therefore, an object of this invention to provide a delta modulator having stable operation and uniform quantizing steps.

Another object of this invention is to provide a delta modulator in which the quantizing steps are large in comparison with the amplitude of the digital signal applied to the integrator.

Another object of this invention is to provide a delta modulator in which the discharge resistor coupled across the integrating capacitor can be made small without limiting the amplitude of reproduced signal, or can be made large or removed completely without loss of balance in the modulator.

A feature of this invention is the provision of a delta modulator in which the modulation signal is coupled to the integrator circuit and thus is not separately applied to the digital signal generator.

Another feature of this invention is the provision of a delta modulator including an integrating capacitor coupled to a reference potential through resistance means very much smaller than the charging-discharging resistors. The modulation signal is applied across the resistance means.

Another feature of this invention is the provision of a delta modulator including an integrating capacitor coupled to a reference potential through resistance means with a discharge resistor for stabilizing purposes coupled across the integrating capacitor and the resistance means.

The invention is illustarted in the drawings in which.

In practicing this invention a delta modulator is provided including an integrator circuit adapted to receive a modulation signal and a digital signal. The integrator circuit acts to integrate the digital signal and to develop a difference signal which is a function of the difference between the integrated digital signal and the modulation signal. In one form of the integrator an integrating capacitor is provided having first and second terminals with first resistance means coupling the first terminal to a reference potential. The modulating signal is applied to the first terminal. Second resistance couples the digital signal to the second terminal of the capacitor. The integrating capacitor and the second resistor act to integrate the digital signal. The first resistance means is very much smaller than the second resistance means. The difference signal is developed at the second terminal of the capacitor. A discharge resistor may be provided between the second terminal and the reference potential to stabilize the modulator. The circuit may also make use of a double integrator if desired.

Figure 1:
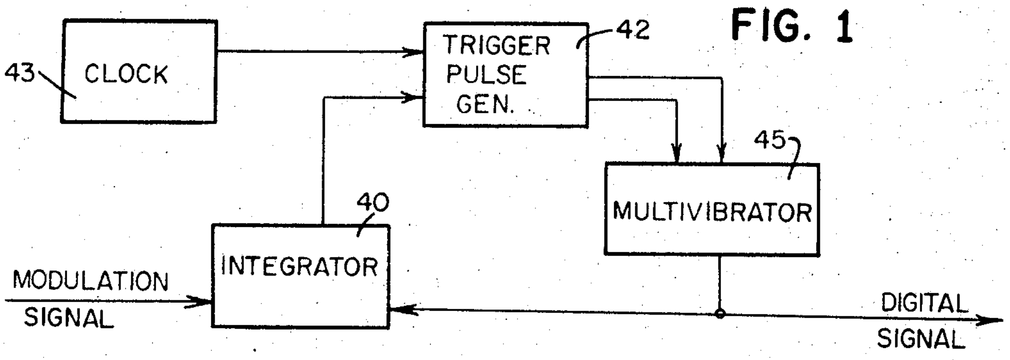
FIG. 1 is a block diagram showing the delta modulator of this invention.

FIG. 1 is a block diagram of the circuit of this invention. In FIG. 1 a modulation signal and a digital signal are applied to an integrator 40. Integrator 40 acts to develop a difference signal which is applied to trigger pulse generator 42 which is periodically enabled by clock 43. The trigger pulse generator has two output terminals and is balanced so that an output signal appears on one of the two output terminals in a random manner when the input voltage is established at a reference potential. During the period pulse generator 42 is enabled it will produce an output pulse on one output terminal if the difference signal is above the reference potential and an output pulse on the other output terminal if the difference signal is below the reference potential. Multivibrator 45 receives the outputs from trigger pulse generator 42 to assume one of two stable states depending on the polarity of the difference signal applied to trigger pulse generator 42. Multivibrator 45 produces a digital signal in accordance with the state to which it is transferred by the output signal from trigger pulse generator 42. This digital signal is shown in FIG. 2 and is applied to integrator 40 and other circuits as desired.

Figure 2:
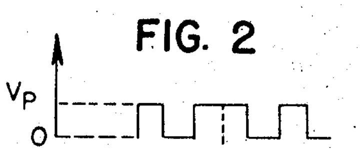
FIG. 2 is a drawing showing the waveform of the digital signal.

FIG. 2 shows the waveform of the digital signal from the delta modulator. The digital signal varies in amplitude from zero volts to a voltage level $V_P$.

Figure 3:
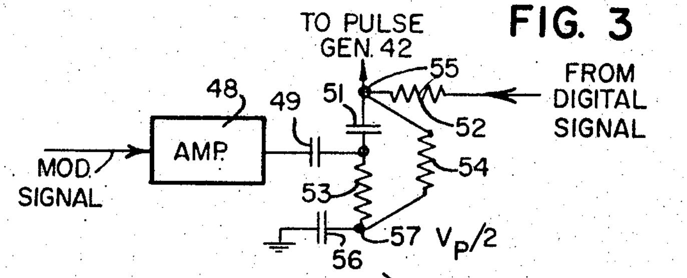
FIG. 3 is a schematic circuit of the integrator of FIG. 1.

A schematic circuit of integrator 40 of FIG. 1 is shown in FIG. 3. The integrator includes an integrating capacitor 51 coupled in series with resistor 53. Resistor 53 is connected to terminal 57 at which a reference potential equal to $V_P/2$ is provided. A large bypass capacitor 56 is provided between terminal 57 and ground. Resistance 52 couples the digital signal from multivibrator 45 to the opposite terminal of capacitor 51 and forms an integrating network with capacitor 51. In order to prevent the voltage drop across resistor 53 from reaching a large enough amplitude to interfere with the charging of capacitor 51, resistor 53 is made very much smaller than resistor 52. The modulation signal is amplified by amplifier 48 and coupled to the junction of capacitor 51 and resistor 53 through capacitor 49. A discharge resistor 54 is provided across capacitor 51 and resistor 53.

The modulation signal appears across resistor 53 and capacitor 51 is charged and discharged by the digital signal through resistor 52. As the modulation signal across resistor 53 increases in amplitude an equivalent digitally reproduced signal, of opposite polarity, builds up across capacitor 51 due to the delta modulator feedback action. Therefore the output terminal 55 of the integrator always stays at $V_P/2$ within one quantizing step.

With the circuit of FIG. 3 the quantizing steps are uniform since the voltage at terminal 55 is almost constant and no modulation signal appears at it. The amplitude of the modulation signal is not limited to a small fraction of $V_P/2$ as was previously necessary in order to have all the quantizing steps within the linear portion of the exponential charging curve of capacitor 51 and resistor 52. The amplitude of the modulation signal may now exceed $V_P/2$ by a large amount and the quantizing steps will still be uniform. Because of this the voltage levels of the digital signal can have a small amplitude ($V_P/2$) and/or large quantizing steps can be provided. Large quantizing steps require a less sensitive trigger pulse generator and a less powerful digital signal generation means which will be more stable in operation.

In the circuit of FIG. 3 discharge resistor 54 can have a low resistance in order to give good stabilization to the idling pattern of the modulator. Since resistor 54 is connected across capacitor 51 and resistor 53 it will not tend to short out or distort the modulation signal.

Figure 4:
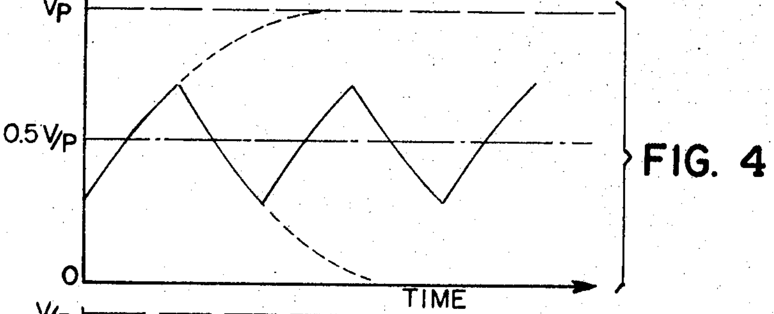
FIG. 4 is a drawing of the charging and discharging waveform of the integrator of FIG. 3.
Figure 5:
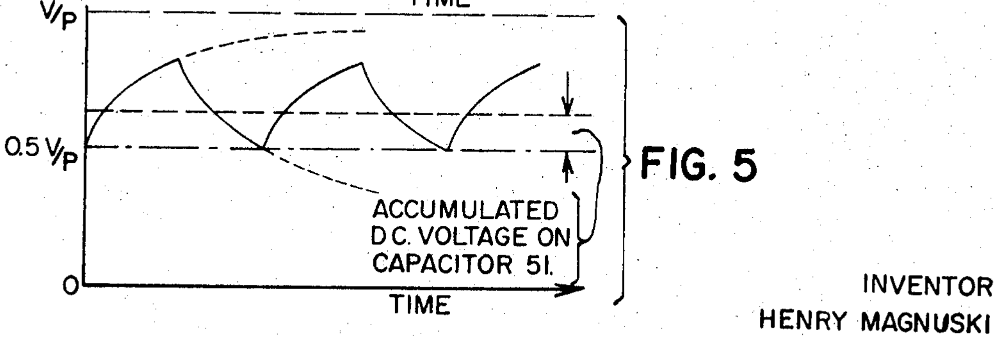
FIG. 5 is a drawing of the charging and discharging waveform of the integrator of FIG. 3.

If resistor 54 is omitted from the circuit a different method of stabilization is possible. If $V_P$ is made small and quantizing steps large in comparison to $V_P$ the charging and discharging voltage curves will not be linear but will follow the exponential curve as shown in FIG. 4. In the case of unbalance between charging and discharging steps a small DC voltage will build up across capacitor 51. This DC voltage acts to change the curvature of the portion of the exponential charging curve which is being used in such a way that the steps are automatically balanced. If, for example, the charging step becomes larger than the discharge step a positive charge accumulates on capacitor 51, as shown in FIG. 5. The charging step now follows a different exponential curve, which has a smaller amplitude since the voltage difference between the charging pulse $V_P$ and the average voltage across capacitor 51 is smaller. Therefore, the charging rate will decrease. For the same reason the discharge rate will increase and the accumulation of the positive charge will continue until a balance between the charging and discharging rate is restored.

Figures 6, 7:
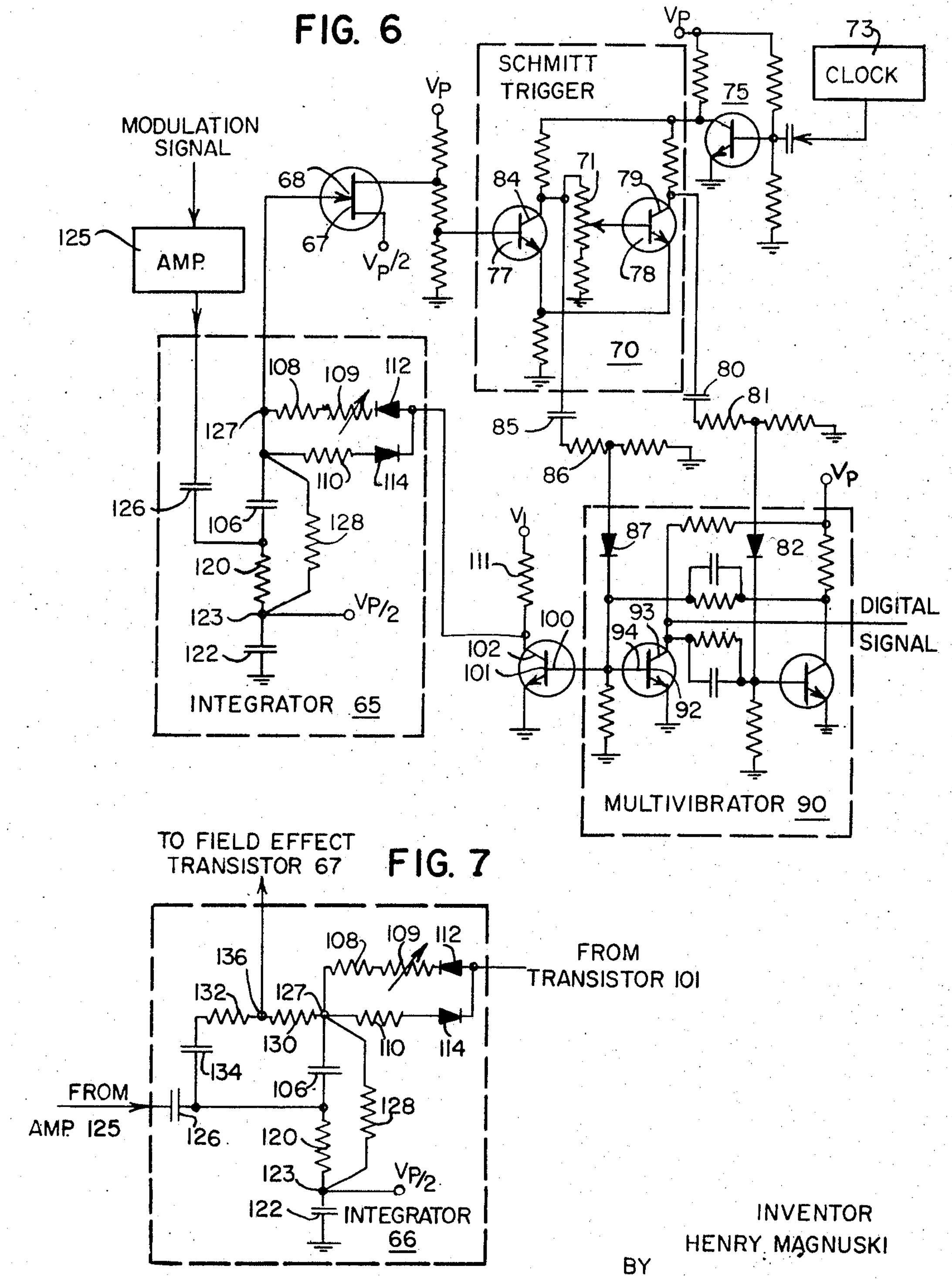
FIG. 6 is a schematic diagram of one embodiment of the invention.
FIG. 7 is a schematic diagram of the integrator circuit of FIG. 6 showing a second embodiment of the invention.

Referring to FIG. 6 there is shown a partial schematic and partial block diagram of a modulator incorporating the features of this invention. A difference signal developed at integrator 65, in a manner to be described subsequently, is coupled to gate 68 of field effect transistor 67. The output of field effect transistor 67 is coupled to Schmitt trigger circuit 70. Field effect transistor 67 is used between integrator 65 and Schmitt trigger 70 in order to avoid loading the integrator. A clock 73 is coupled to Schmitt trigger 70 through transistor amplifier 75. Pulses from clock 73 periodically enable Schmitt trigger 70 and the triggering operation takes place only during the periods when Schmitt trigger 70 is enabled. Schmitt trigger 70 is normally disabled and is periodically enabled by pulses from clock 73. Variable resistor 71 is adjusted so that when the input gate 68 of transistor 67 is shorted to the reference potential $V_P/2$ (that is, the differential signal is zero) Schmitt trigger 70 triggers erratically about half of the time one way and half the time the other way, when the clock pulses are applied to it.

In normal operation, with an enabling pulse from clock 73 applied to Schmitt trigger 70, transistor 77 is nonconducting while transistor 78 conducts if the difference signal voltage from integrator 65 is below $V_P/2$, and a pulse is developed at collector 84 of transistor 77. This pulse is coupled from collector 84 through capacitor 85, resistor 86 and diode 87 to multivibrator 90 and causes multivibrator 90 to assume one of its two stable states. If the voltage from integrator 65 is above $V_P/2$ the enabling pulse from clock 73 will cause a pulse to be developed at collector 79 of transistor 78. This pulse is coupled through capacitor 80, resistor 81 and diode 82 to multivibrator 90. The pulse from transistor 77 causes multivibrator 90 to assume its other stable state. The output of multivibrator 90 is taken from collector 93 of transistor 92.

The output from collector 93 of transistor 92 is the digital signal developed by the delta modulator and is coupled to other circuits for use thereby. Thus the digital signal formed depends upon the state to which multivibrator 90 is switched. This in turn depends upon the polarity of the difference signal from integrator 65. A reciprocal of the digital signal appears on base 94 of transistor 92 and is coupled to base 100 of transistor 101. This reciprocal digital signal is amplified and inverted in transistor 101 so that the signal appearing on collector 102 of transistor 101 is the same as the digital signal on collector 93 of transistor 92. This digital signal is coupled to integrator 65.

Integrator 65 includes an integrating capacitor 106 and charging resistors 108, 109 and 110. With the voltage output on collector 102 equal to $V_P$ a charging current flows through resistor 111, diode 112, resistors 109 and 108 to capacitor 106. With transistor 101 biased to conduction the voltage appearing at collector 102 drops to near zero and discharge of capacitor 106 takes place through resistor 110, diode 114 and transistor 101. Thus, there is a difference in the resistance of the charging and discharging paths for capacitor 106. In order to balance these paths resistor 109 is made variable and adjusted so that the resistance of the charging path and discharging path are as closely equal as possible.

One terminal of capacitor 106 is connected to a reference potential $V_P/2$ at terminal 123 by resistor 120. Capacitor 122, connected between terminal 123 and ground, acts as a bypass capacitor. A modulation signal is amplified in amplifier 125 and coupled to the junction of capacitor 106 and resistor 120 through capacitor 126. The modulation signal is applied across resistor 120 which is small in comparison to the charging and discharging path resistors 108, 109, 110. As the amplitude of the modulation signal increases across resistor 120 an equivalent digitally reproduced signal of opposite polarity is built up across capacitor 106 due to the modulator feedback loop action. Therefore, the voltage at terminal 127 of capacitor 106 remains at $V_P/2$ within one quantizing step. The signal appearing at terminal 127 is the difference signal and is coupled to gate 68 of field effect transistor 67 as previously described. A discharge resistor 128 is coupled across capacitor 106 and resistor 120 to provide stabilization of the idling pattern of the delta modulator. Resistor 109 is adjusted to balance the modulator and resistor 128 is used to keep the modulator balanced in case resistors 108, 109 and 110 become unbalanced. If resistor 128 is not used a different form of balancing action takes place as previously described.

In FIG. 7 integrator 65 is replaced by integrator 66 which is a double integrator. Portions of integrator 66 which are the same as integrator 65 have the same reference numerals. In integrator 66 a signal appearing at terminal 127 is further integrated by the integrator consisting of resistors 130, 132 and capacitor 134. A voltage resulting from the second integration appears at terminal 136 and is the difference signal which is coupled to field effect transistor 67.

Examples of component values which may be used to implement the integration of FIGS. 6 and 7 are given in the following table. The circuits are not limited to these values.

| | | |
|---|---|---|
| Resistor: | | |
| **111** | ohms | 4.7K |
| **108** | do | 150K |
| **109** | ohms potentiometer | 0–100K |
| **110** | ohms | 180K |
| **120** | do | 1,000 |
| **128** | do | 47,000 |
| **130** | do | 33,000 |
| **132** | do | 10,000 |
| Capacitor: | | |
| **106** | mfd | 0.01 |
| **134** | pfd | 470 |

I claim:

1. A delta modulator for developing a digital signal in response to a modulation signal applied thereto, including in combination, integration means including capacitor means having first and second terminals, digital signal generation means having an input circuit coupled to said first terminal and an output circuit, first circuit means coupling said output circuit to said integration means, said integration means further including input circuit means coupled to said second terminal for receiving the modulation signal, said integration means being responsive to the modulation signal whereby a control voltage is developed at said first and second terminals, said digital signal generation means being responsive to said control voltage at said first terminal above a predetermined magnitude to develop pulses forming the digital signal, said integration means being responsive to said pulses to change the charge on said capacitor means whereby the magnitude of said control voltage at said first terminal is reduced.

2. The delta modulator of claim 1, wherein said input circuit means of said integration means includes first resistance means coupled between said second terminal and a reference potential, and said integration means further includes second resistance means coupling said first circuit means to said first terminal.

3. A delta modulator for developing a digital signal in response to a modulation signal applied thereto, including in combination, integration means including capacitor means having first and second terminals, control circuit means coupled to said first terminal, multivibrator circuit means having an input coupled to said control circuit means and an output coupled to said integration means, clock means coupled to said control circuit means for generating a clock signal to enable said control circuit means periodically, said integration means further including input circuit means coupled to said second terminal for receiving the modulation signal, said integration means being responsive to the modulation signal whereby a control voltage is developed at said first and second terminals, said control circuit means being responsive to said control voltage at said first terminal above a predetermined magnitude and said clock signal to develop a trigger signal, said multivibrator circuit means being responsive to said trigger signal to develop pulses forming the digital signal, said integration means being responsive to said pulses to change the charge on said capacitor means whereby the magnitude of said control voltage at said first terminal is reduced.

4. The delta modulator of claim 3 wherein, said input circuit means of said integration means includes first resistance means coupled between said second terminal and a reference potential, and said integration means further includes second resistance means coupling said multivibrator circuit means to said first terminal.

5. The delta modulator of claim 1 wherein said integration means further includes third resistance means coupled between said first terminal and said reference potential.

6. The delta modulator of claim 5 wherein said integration means further includes fourth resistance means coupled to said first terminal, second capacitance means coupled between said fourth resistance means and said second terminal, and wherein said input circuit of said digital signal generation means is coupled to said fourth resistance means.

7. The delta modulator of claim 4 wherein said integration means further includes third resistance means coupled between said first terminal and said reference potential.

8. The delta modulator of claim 7 wherein said integration means further includes fourth resistance means coupled to said first terminal, second capacitance means coupled between said fourth resistance means and said second terminal and said control circuit means is coupled to said fourth resistance means.

References Cited

UNITED STATES PATENTS

| | | | |
|---|---|---|---|
| 2,803,702 | 8/1957 | Ville et al. | |
| 2,894,215 | 7/1959 | Toy | 332—14 |
| 2,918,574 | 12/1959 | Gimpel et al. | 328—127 X |
| 3,210,558 | 10/1965 | Owen | 328—127 X |
| 3,273,141 | 9/1966 | Hackett. | |

ALFRED L. BRODY, *Primary Examiner.*

U.S. Cl. X.R.

307—251, 265; 325—38; 328—63, 127; 331—17; 332—14